United States Patent [19]
Tom et al.

[11] Patent Number: 5,993,766
[45] Date of Patent: Nov. 30, 1999

[54] GAS SOURCE AND DISPENSING SYSTEM

[75] Inventors: Glenn M. Tom, New Milford; James V. McManus, Danbury, both of Conn.

[73] Assignee: Advanced Technology Materials, Inc., Danbury, Conn.

[21] Appl. No.: 08/859,578

[22] Filed: May 20, 1997

Related U.S. Application Data

[60] Provisional application No. 60/019,026, May 20, 1996, and provisional application No. 60/019,020, May 20, 1996.

[51] Int. Cl.[6] .............................. B01D 53/02; C01B 6/10; C01B 25/00; C01B 35/06
[52] U.S. Cl. .................................. 423/294; 95/90; 95/95; 95/116; 95/131; 96/108; 206/0.7; 423/210; 423/292; 423/293; 423/299
[58] Field of Search .................................. 95/95, 90, 116, 95/131; 423/293, 210, 292, 294, 299; 96/108; 206/0.7

[56] References Cited

U.S. PATENT DOCUMENTS

| | | | |
|---|---|---|---|
| 5,407,465 | 4/1995 | Schaub et al. ............................. | 95/102 |
| 5,417,742 | 5/1995 | Tamhankar et al. ......................... | 95/96 |
| 5,518,528 | 5/1996 | Tom et al. ................................... | 95/95 |
| 5,733,515 | 3/1998 | Doughty et al. ................... | 423/244.01 |

*Primary Examiner*—Wayne Langel
*Attorney, Agent, or Firm*—Steven J. Hultquist; Oliver A.M. Zitzmann

[57] ABSTRACT

A system for the storage and delivery of a sorbable fluid, comprising a storage and dispensing vessel containing a sorbent material having sorptive affinity for the sorbable fluid, and from which the fluid is desorbable by pressure-mediated and/or thermally-mediated desorption, wherein the sorbent material is functionally enhanced by a reagent which alters the binding energy of the fluid to the sorbent. In a preferred aspect, the system is arranged for storage and delivery of $B_2H_6$, in which the sorbent material has sorptive affinity for $B_2H_6$ and is effective when $B_2H_6$ is contacted with the sorbent to convert $B_2H_6$ to a sorbed $.BH_3$ form, which is desorbable by pressure-mediated desorption and/or thermally-mediated desorption to release $B_2H_6$ from the sorbent, and means for selectively discharging desorbed $B_2H_6$ from the vessel

19 Claims, 2 Drawing Sheets

GAS SOURCE AND DISPENSING SYSTEM

CROSS-REFERENCE TO RELATED APPLICATION

This application is based on and claims the priority of United States Provisional Patent Application No. 60/019,026 filed May 20, 1996 and the priority of United States Provisional Patent Application No. 60/019,020 filed May 20, 1996.

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More particularly, the present invention relates to a system for the storage and delivery of $B_2H_6$.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arrranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

In the ion implantation industry, the three major implant gases are arsine, phosphine, and boron trifluoride. The implantation industry desires a process gas source that would deliver diborane, $B_2H_6$, in the tool. There are a number of potential advantages to $B_2H_6$ over boron trifluoride in ion implant. Diborane contains no fluorine, which corrodes system plumbing. With $BF_3$ implant, after implant, post-annealing releases F which corrodes metal contacts on the wafer. In addition, F etches graphite and tungsten components in the source chamber. $B_2H_6$ ionizes into $B_2H_5^+$, which permits shallower implants that are possible with $BF_2^+$ and $B^+$ ions.

Currently, the storage of high pressure $B_2H_6$ is difficult since $B_2H_6$ is unstable with respect to the elements. At higher pressure, the instability increases.

Accordingly, it would be a significant advance in the art to provide a low pressure source of $B_2H_6$ which is easily dispensed, for use in ion implantation and other processes.

In use of the storage and dispensing systems described above, the amount of fluid sorbed on the sorbent is typically not completely desorbed during the dispensing operation, particularly when pressure differential desorption is employed. Accordingly, there has been continuing effort to improve the amount of the originally sorbed fluid which can be subsequently desorbed and dispensed in the later use of the storage and dispensing system.

In general, the amount of sorbed fluid which can be recovered for discharge in the dispensing operation at low non-zero pressure levels, e.g., 10 Torr, will depend on the sorbent medium. For example, a bead activated carbon such as BAC-G-70R (Kureha Corporation of America, New York, N.Y.) has adsorption/desorption characteristics permitting about 55% of arsine gas initially loaded on the sorbent to be removed at 10 Torr. For a 5 A zeolite sorbent, the corresponding percentage is on the order of 30% of the initially sorbed arsine gas.

It is highly desirable to extract a maximum portion of the sorbate gas from the storage and dispensing system during its usage, before refill or renewal of the storage and dispensing vessel is carried out.

It therefore is an object of the present invention to provide enhanced sorbent materials affording increased desorption recovery of the sorbed fluid for dispensing from a storage and dispensing system of the type broadly described hereinabove.

Other objects and advantages of the invention will be more fully apparent from the ensuing disclosure.

SUMMARY OF THE INVENTION

The present invention relates to a system for storage and dispensing of a sorbable fluid, comprising a storage and dispensing vessel constructed and arranged to hold a solid-phase physical sorbent medium having a sorptive affinity for the sorbable fluid, and for selectively flowing sorbable fluid into and out of such vessel. A solid-phase physical sorbent medium having a sorptive affinity for the fluid is disposed in the storage and dispensing vessel at an interior gas pressure. The sorbable fluid is physically adsorbed on the sorbent medium. A dispensing assembly is coupled in gas flow communication with the storage and dispensing vessel, and constructed and arranged for selective on-demand dispensing of desorbed fluid, after thermal and/or pressure differential-mediated desorption of the fluid from the sorbent material, with the dispensing assembly being constructed and arranged:

(I) to provide, exteriorly of said storage and dispensing vessel, a pressure below said interior pressure, to effect desorption of fluid from the sorbent material, and flow of desorbed fluid from the vessel through the dispensing assembly; and/or (II) to flow thermally desorbed fluid therethrough, and comprising means for heating the sorbent material to effect desorption of the fluid therefrom, so that the desorbed fluid flows from the vessel into the dispensing assembly.

In one aspect, the invention relates to a system for the storage and delivery of a sorbable fluid, comprising a storage and dispensing vessel containing a sorbent material having sorptive affinity for the sorbable fluid, and from which the fluid is desorbable by pressure-mediated and/or thermally-mediated desorption, wherein the sorbent material is functionally enhanced by a reagent which alters the binding energy of the fluid to the sorbent.

By pressure-mediated desorption is meant desorption which involves the establishment of pressure conditions which cause the sorbed fluid to desorb from the sorbent material. For example, such pressure conditions may involve the establishment of a pressure differential between the sorbent in the vessel, and the exterior environment of the vessel, which causes flow of the fluid from the vessel to the exterior environment, e.g., through a manifold, piping, conduit or other flow region or passage. The pressure conditions effecting desorption may involve the imposition on the sorbent of vacuum or suction conditions which effect extraction of the fluid from the sorbent and the vessel containing same.

By thermally-mediated desorption is meant heating of the sorbent to cause the desorption of the fluid from the sorbent, so that the desorbed fluid can be withdrawn or discharged from the vessel containing the sorbent holding the fluid.

The sorbent material is functionally enhanced by a reagent which alters the binding energy of the fluid to the sorbent in any suitable manner, as for example by functionalizing the surface of the sorbent with functional groups which coordinate to the fluid or a product thereof, or by reaction of the fluid with the sorbent to yield a reaction product for which the sorbent has sorptive affinity, or in any other manner in which the affinity of the sorbent material is enhanced in relation to the sorbent in the absence of the reagent or functionalization of the sorbent. The binding energy of the sorbent to the fluid may be increased or decreased, as necessary to render the sorbent useful for sorptively holding the fluid and permitting the fluid to be desorbed during the pressure- and/or thermally-mediated desorption conditions.

In a preferred aspect, the system of the invention is arranged for storage and delivery of $B_2H_6$, in which the sorbent material has sorptive affinity for $B_2H_6$ and is effective when $B_2H_6$ is contacted with the sorbent to convert $B_2H_6$ to a sorbed $.BH_3$ form, which is desorbable by pressure-mediated desorption and/or thermally-mediated desorption to release $B_2H_6$ from the sorbent, and means for selectively discharging desorbed $B_2H_6$ from the vessel In the practice of such preferred aspect of the invention, $B_2H_6$ is adsorbed on a polymer or other substrate material functionalized with $NR_2$ groups. As a Lewis acid, $B_2H_6$ will be stabilized by a Lewis base. For example, $BH_3.NMe_3$ is a very stable compound. Groups with greater steric hindrance or electron withdrawing character will provide the system with higher vapor pressure.

Thus, the $B_2H_6$ gaseous reagent is adsorbed on an aminated sorbent substrate, so that the aminated surface effects the reaction:

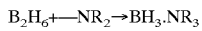

$$B_2H_6 + -NR_2 \rightarrow BH_3.NR_3$$

wherein R is hydrogen or a sterically acceptable hydrocarbyl group such as $C_1$–$C_8$ alkyl, $C_7$–$C_{14}$ alkaryl, $C_7$–$C_{14}$ aralkyl, etc.

The sorbent medium which is aminated to accommodate the above sorptive reaction may include any suitable sorbent substrate material. Preferred substrates include crystalline aluminosilicate compositions, e.g., with a pore size in the range of from about 4 to about 13 Å, although crystalline aluminosilicate compositions having larger pores, e.g., so-called mesopore compositions with a pore size in the range of from about 20 to about 40 Å are also potentially usefully employed in the broad practice of the invention.

Examples of such crystalline aluminosilicate compositions include 5 A molecular sieve, and preferably a binderless molecular sieve.

Although carbon sorbents and molecular sieve materials such as crystalline aluminosilicates are preferred in many instances, the solid-phase physical sorbent medium may usefully comprise other materials such as silica, alumina, macroreticulate polymers, kieselguhr, etc.

The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species.

Potentially useful carbon materials include so-called bead activated carbon of highly uniform spherical particle shape, e.g., BAC-MP, BAC-LP, and BAC-G-70R, available from Kreha Corporation of America, New York, N.Y.

The sorbent substrate is aminated in any useful manner, such as reactive exposure to ammonia, treatment of the sorbent with amine reagents under amination conditions, quaternary ammonium impregnation of the sorbent, etc. The amine groups may be presented as functional groups of a polymeric moiety, such as polyvinylamine, which is adsorbed on the support. In another modification, the electron donor may be in the form of a nitrile group, as in polyacrylonitrile.

Once aminated with a sufficient concentration of surface amine groups, the aminated substrate may be loaded with the diborane gas, which will react with the surface amine functionalities, to form the complex $BH_3 \cdot NR_3$ on the surface of the substrate material. When it is desired to dispense $B_2H_6$ from the sorbent substrate, the sorbent bed is desorbed by pressure differential and/or by thermal desorption, to generate $B_2H_6$ from the surface complexes of $BH_3 \cdot NR_3$. The complexed compounds $BH_3 \cdot NR_3$ are very stable and thus can be stored efficiently in a storage and dispensing vessel of the type more fully disclosed in U.S. Pat. No. 5,518,528 issued May 21, 1996 in the names of Glenn M. Tom and James V. McManus, wherein the storage and dispensing vessel contains a suitable sorbent having sorptive affinity for the diborane gas as well as the boranyl amine complex.

In a storage and dispensing system as broadly described above, the size of pores in the sorbent has been found to strongly influence the binding energy of the adsorbed gas molecules of the sorbable fluid. In the case of sorbent materials having a large fraction of pore volume and surface area constituted by micropores, i.e., pores with a diameter in the range of 20 Angstroms and less, it is very difficult to remove gas molecules in the desorption dispensing step. The difficulty of desorption in such porosity regime presents a deficiency which has been recognized but largely unresolved in prior art practice.

The present invention contemplates reaction of the sorbent material with a reagent which decreases the binding energy of the sorbent to the fluid. By such reduction of binding energy of the sorbent in relation to the sorbed fluid, the delivery of fluid in the dispensing mode of the storage and dispensing system is increased.

Other aspects and features of the invention will be more fully apparent from the ensuing disclosure.

DETAILED DESCRIPTION OF THE INVENTION, AND PREFERRED EMBODIMENTS THEREOF

The disclosure of U.S. Pat. No. 5,518,528 issued May 21, 1996 in the names of Glenn M. Tom and James V. McManus, and the disclosure of U.S. patent application Ser. No. 08/650,634 filed May 20, 1996 in the names of Glenn M. Tom and James V. McManus for "FLUID STORAGE AND DELIVERY SYSTEM UTILIZING CARBON SORBENT MEDIUM", hereby are incorporated herein by reference in their entirety.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
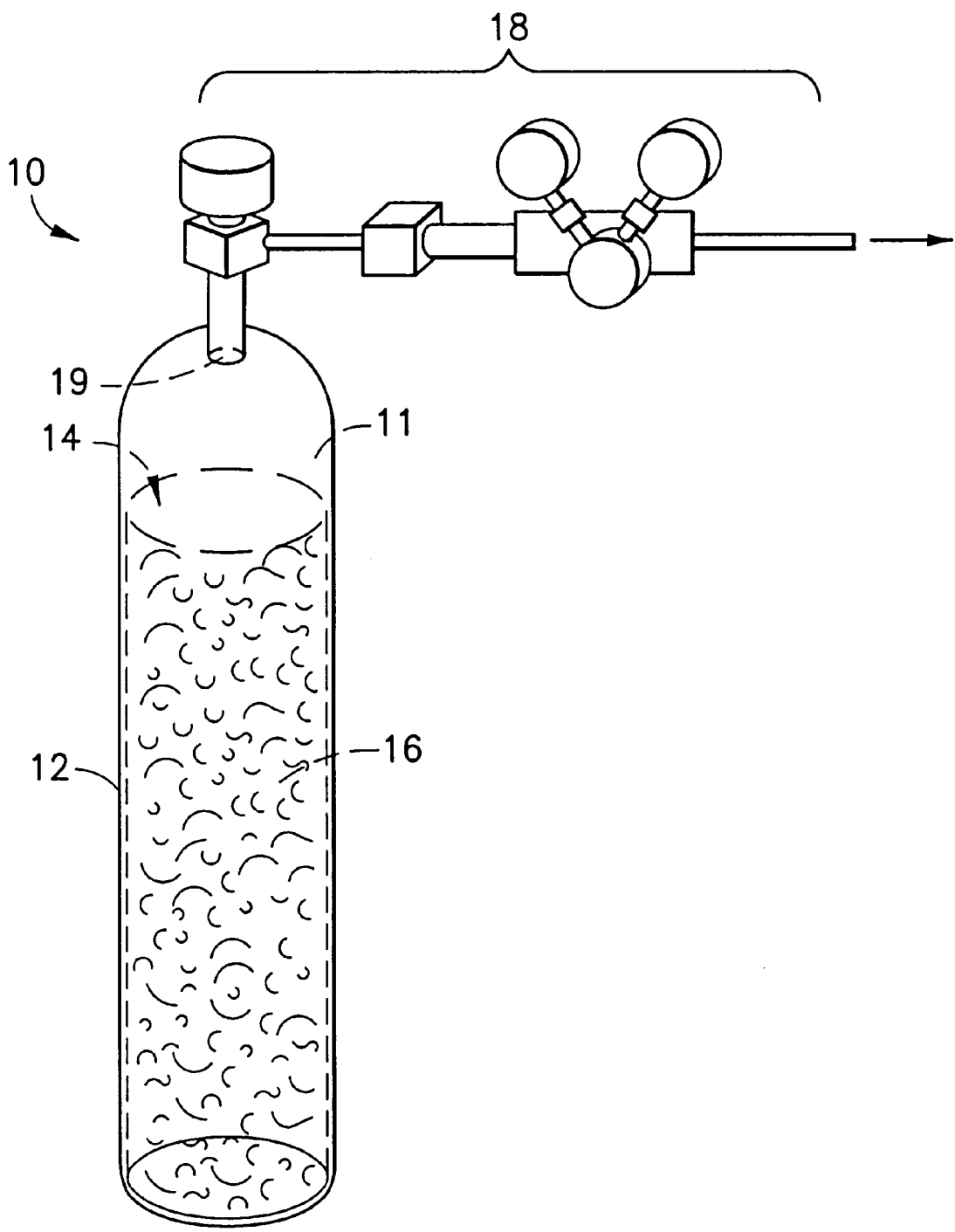
FIG. 1 is a schematic perspective representation of a storage and dispensing vessel and associated flow circuitry according to one embodiment of the invention, which may be usefully employed for the storage and dispensing of diborane.

Referring now to the drawings, FIG. 1 is a schematic representation of a storage and dispensing system 10 comprising storage and dispensing vessel 12. The storage and dispensing vessel may for example comprise a conventional gas cylinder container of elongate character. In the interior volume of such vessel is disposed a bed 14 of a suitable sorbent medium 16.

The vessel 12 is provided at its upper end with a conventional cylinder head fluid dispensing assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein.

The vessel 12 may be provided with internal heating means (not shown) which serve to thermally assist desorption of the diborane. Preferably, however, the diborane is at least partially, and most preferably fully, dispensed from the storage and dispensing vessel containing the borane•amine adduct by pressure differential-mediated desorption. Such pressure differential may be established by flow communication between the storage and dispensing vessel, on the one hand, and the vacuum or low pressure ion implantation chamber, on the other.

The sorbent medium 16 may comprise any suitable sorptively effective material, having sorptive affinity for the fluid to be stored and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

The surface of the sorbent particles, granules, extrudates, powders, or other suitable conformation of the sorbent, is aminated in any suitable manner as hereinearlier discussed to provide a requisite concentration of amine functional groups on the surface of the sorbent. The sorbent is then loaded by contact with diborane gas, for example by bulk filling of the cylinder or other vessel containing the aminated sorbent, with diborane supplied by an appropriate gas fill manifold.

By such contacting, the diborane reacts with the amine surface functional groups, and forms the complex $BH_3 \cdot NR_3$. This adduct then is readily desorbed by pressure and thermal desorption techniques, to release the diborane from the sorbent.

The storage and dispensing system of FIG. 1 thus may be usefully employed for the storage and dispensing of diborane, in accordance with the invention.

Such adsorption-desorption apparatus, for storage and dispensing of diborane, such apparatus comprising:

a storage and dispensing vessel constructed and arranged for (1) holding a solid-phase physical sorbent medium comprising aminated sorptive surface therein having a sorptive affinity for diborane and reactively complexing with the sorbed diborane to form a borane-amine complex on the sorbent medium, and (2) selectively flowing diborane into and out of the vessel;

a solid-phase physical sorbent medium comprising aminated sorptive surface therein having a sorptive affinity for diborane, disposed in the storage and dispensing vessel at an interior gas pressure;

$BH_3.NR_3$, physically complexed on said solid-phase physical sorbent medium; and a dispensing assembly coupled in gas flow communication with the storage and dispensing vessel, and constructed and arranged for selective on-demand dispensing of desorbed diborane, after thermal and/or pressure differential-mediated desorption of the diborane from the sorbent material, with the dispensing assembly being constructed and arranged:

(I) to provide, exteriorly of said storage and dispensing vessel, a pressure below said interior pressure, to effect desorption of diborane from the sorbent material, and flow of desorbed diborane from the vessel through the dispensing assembly; and/or (II) to flow thermally desorbed diborane therethrough, and comprising means for heating the sorbent material to effect desorption of the diborane therefrom, so that the desorbed diborane flows from the vessel into the dispensing assembly.

As mentioned, although it generally is preferred to operate solely by pressure differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the diborane gas from the solid-phase physical sorbent medium.

The apparatus of the invention optionally may be constructed with a solid-phase physical sorbent medium being present in the storage and dispensing vessel together with a chemisorbent material having a sorptive affinity for contaminants, e.g., decomposition products, of the sorbate gas therein.

The surface of the sorbent particles, granules, extrudates, powders, or other suitable conformation of the sorbent, thus may be treated or functionalized in accordance with the present invention, e.g., aminated, to provide a requisite concentration of sorption sites on the surface of the sorbent. The sorbent is then loaded by contact with sorbable fluid, for example, by bulk filling of the cylinder or other vessel containing the sorbent, with sorbable fluid supplied by an appropriate gas fill manifold.

The present invention contemplates the reaction of the sorbent material with a reagent which decreases the binding energy of the sorbent to the sorbable gas which is stored on and dispensed from the sorbent, in the use of the storage and dispensing system. By decreasing the binding energy of the sorbent for the fluid, it is possible to increase the delivery of fluid from the storage and dispensing vessel containing the sorbable fluid-loaded sorbent material.

Figure 2:
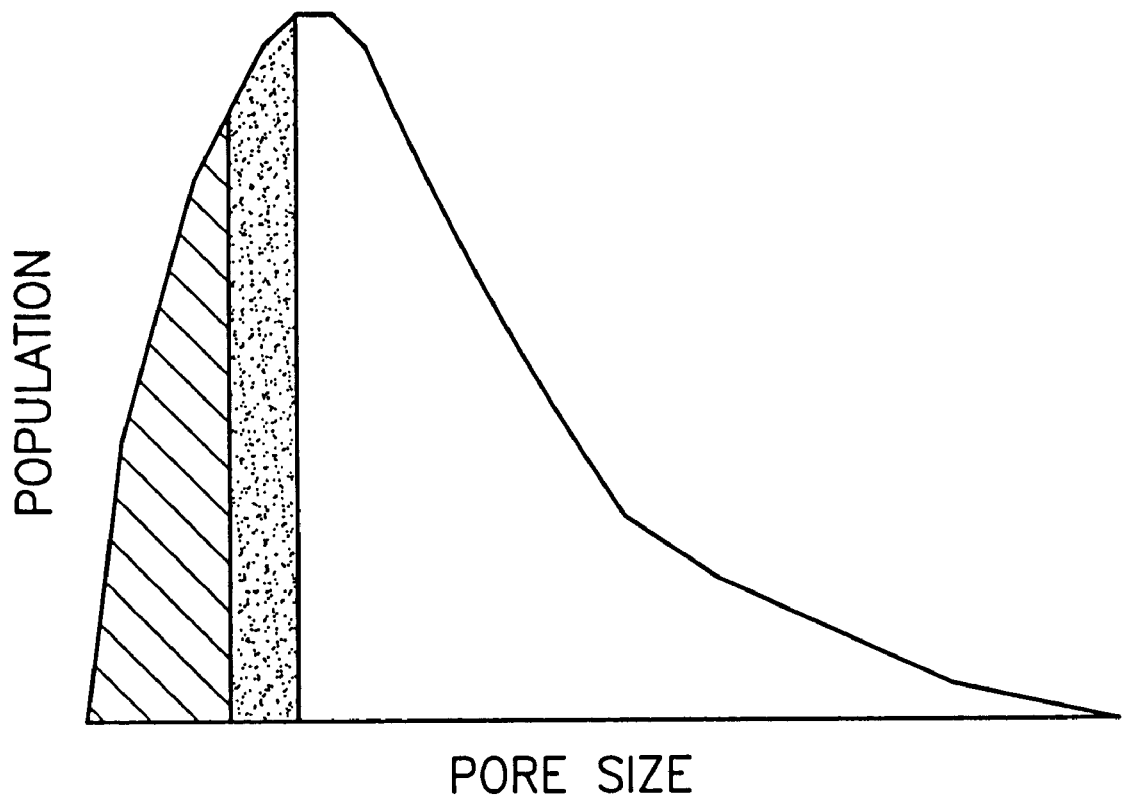
FIG. 2 is a graph of the population of adsorption sites on a sorbent usefully employed in the storage and dispensing system of the invention, as a function of pore size.

Referring to FIG. 2, there is shown a graph of population of adsorption sites on an illustrative sorbent material, as a function of pore size of such material. The left-hand portion of the area under the population curve indicated by crosshatching represents the micropore volume of the sorbent, comprising pores having a diameter of less than about 20 Angstroms. The shaded band to the right of the micropore regime represents mesopores having a diameter of from about 20 to about 1000 Angstroms. The unshaded portion at the right hand of the area under the curve is attributable to the macropore portion of the porosity, constituted by pores having a diameter in excess of 10,000 Angstroms.

Although in the pore size distribution plot of FIG. 2, the micropores constitute a minor portion of the total porosity of the sorbent, such micropores present a disproportionately large resistance to desorption of the sorbed gas, and the principal obstacle to desorbing substantially the entire mass of sorbate initially loaded on the sorbent medium.

The present invention therefore contemplates the reaction of the sorbent material with a reagent altering the binding energy of the sorbent for the specific gas. By such reaction, the sorptive affinity of the sorbent for the sorbable fluid may be reduced to a level retaining good sorption characteristics for the gas when initially loaded and subsequently stored on the sorbent, but affording significantly easier desorption of the sorbate fluid from the sorbent under pressure differential or thermal dispensing conditions in the sorbent bed.

As an illustrative example of the invention, a carbon sorbent may be reacted with a fluorinating reagent, such as fluorine gas, hydrogen gas, hydrogen fluoride, etc., to provide a fluorinated carbon surface of the sorbent. Such fluorination is carried out to alter the binding energy of the carbon sorbent surface, in the micropores, mesopores, and macropores, across the full range of pore sizes in the sorbent medium, to reduce the binding energy for desorption purposes while retaining sufficient sorptive affinity for the sorbable fluid to maintain an effective capacity for storage and dispensing operation.

As another illustrative example, zeolite materials have high sorptive affinity for hydride gases such as arsine and phosphine. Nonetheless, sorbed hydride gases of such type are not readily released under low pressure differential dispensing conditions, due to the high sorptive affinity of the zeolite for the hydride gas. The zeolite therefore may be modified by reaction with etheric or other polyoxy hydrocarbyl compounds, e.g., polyethers, to modify the zeolite binding site so that the zeolite has reduced sorptive affinity relative to "naked" or untreated zeolite, but improved desorption release properties as compared to the unmodified zeolite material while possessing sufficient sorptive affinity to retain the hydride gas with good capacity.

It will be recognized that the nature of the modifying reagent which is reacted with the sorbent will vary widely in the broad practice of the present invention, and that suitable modifying reagents can readily be determined without undue experimentation, within the skill of the art, by the simple expedient of reacting the sorbent surface with the modifying reagent and making adsorption/desorption determinations to identify the working capacity of the modified material relative to the unmodified sorbent starting material.

As used herein, working capacity is defined as the weight of sorbate originally loaded on the sorbent material which is removable from the sorbent medium in the fluid dispensing operation at given pressure and temperature conditions, per unit weight of the sorbent material, where the sorbent weight, sorbate weight and desorbate weight are all measured in the same weight units.

The present invention further contemplates other boron source materials, for applications such as ion implant, in which the boron source material may be stored and dispensed from a vessel containing the source material, optionally on a sorbent, support, or other material which stablilizes the source material, or with which boron is stable yet releasable from the vessel supplying the boron source material.

As a specific application, the delivery of boron to ion implanters can potentially be improved by increasing capacity of the $BF_3$ delivery system or by introducing alternative reagents, including those based on borane $BH_3$ and its derivatives. The replacement or modification of the activated carbon adsorbent in the $BF_3$ storage and dispensing system as described hereinabove may permit substantial improvements in throughput to be achieved in some applications. Further improvements in boron ion incorporation are feasible through the use of other potential precursors, such as higher nuclearity clusters like pentaborane and decaborane or from a borane adduct $BH_3.L$. Still other precursors include boron hydrogen fluorides and subvalent boron fluorides.

All boranes are thermodynamically unstable with respect to the elements, having positive heats of formation. Diborane as well as some of its higher nuclearity relatives have exceptionally high heats of combustion per unit weight and are potentially explosive. All of the boranes are good reducing agents and must be kept away from unsaturated chemicals. Care must also be taken to minimize reactions with some ethers and halocarbons.

Diborane ($T_b=-93°$ C.) is readily hydrolyzed in water and is spontaneously flammable in air. It is available as a compress gas (ambient temperature) or as a liquid (cylinder packaged in dry ice). The pyrolysis of diborane above 100° C. is very complex and begins with disproportionation to form borane $BH_3$. Pentaborane $B_5H_9$ ($T_m=-47°$ C., $T_b=60°$ C.) is a toxic liquid that is formed by the pyrolysis of $B_2H_6$ in hydrogen at 250° C. It is thermally stable at 25° C. but decomposes slowly at 150° C. by eliminating hydrogen. While pentaborane is pyrophoric and can detonate in air, it only slowly hydrolyzes in water at room temperature, eliminating hydrogen. Pentaborane has a vapor pressure of 200 torr at 20° C. Decaborane $B_{10}H_{10}$ ($T_m=100°$ C.; $T_b=213°$ C. (extrap.)) has been prepared on the multiton scale as a rocket fuel by pyrolysis of $B_2H_6$ at 150° C. in the presence of dimethyl ether. It has a vapor pressure of only 19 torr at 100° C. Decaborane does not combust in air, is thermally stable to 150° C. and only very slowly hydrolyzes in water (in which it has limited solubility). It ignites in oxygen at 100° C.

There is a substantially developed adduct chemistry of borane $BH_3$. Formation of diborane by thermolysis of these adducts requires care as formation of other boranes is well-documented at elevated temperatures. Borane can be obtained by thermal decomposition of $PF_3.BH_3$ but cannot be isolated as the mononuclear species. It is considered a stronger Lewis acid that $BF_3$. Adduct stability for $BH_3.L$ is: $PF_3<CO<Et_2O<Me_2O<THF<C_4H_8S<Et_2S<Me_2S<py<Nme_3<H-$ $LiBH_4$ decomposes above 380° C. while the Na, K and Cs salts are stable to ca. 600° C. It has been observed that diborane $B_2H_6$ can follow either of two cleavage paths in the presence of a Lewis base. Small bases such as ammonia can result in asymmetric cleavage of $B_2H_6$ to form borohydride $[BH_2(NH_3)_2]BH_4$ complexes. Large bases such as trimethylamine form monoadducts $NMe_3.BH_3$; this latter mechanism is much more common. A large number of these neutral base adducts have been reported, primarily due to the interest in hydroboration chemistry. Primary and secondary amine boranes are thermally unstable above ca. 70° C. From the catalysis studies it is apparent that the most active borane complexes are those with complexing agents that form the weakest adducts.

The following adducts are listed in terms of rate of catalysis: $BH_3$.N-phenlymorpholine ($T_m=98°$ C.)>$BH_3$.N, N-diethylaniline $NEt_2Ph$ ($T_m=-28°$ C.)>$BH_3$.N,N-dimethylaniline $NMe_2Ph$ ($T_m=35°$ C). The dissociation of the free borane in solution is vital to their activity. The 2,6-lutidine adduct of $BH_3$ is quite stable in comparison with the adduct of the much larger $BF_3$ molecule which readily undergoes dissociation. Polymer-bound amine boranes called Amboranes have been prepared for recovery of precious metals.

A large number of borane adducts have been formed using other heteroatom bases, e.g., $BH_3$.THF which is commercially available in a 1 M solution in THF ($T_b=66°$ C.); available data indicate that upon heating diborane is lost from the solution at temperatures above 40° C. at atmospheric pressure. The solution is typically stored at 0–50° C. to maximize shelf-life. At higher temperatures some O—C bond cleavage occurs to form the ring-opened product $(B(O-n-Bu)_3$, such reduction being typical of most ethers. The solution may be stabilized with a small amount of borohydride anion. A one molar solution therefore contains 13 g or 1 mole of borane (0.5 mole diborane) per liter, a loading of ca. 2.5 wt %. Since pressure-swing desorption will result in unacceptable volatilization of THF, other less volatile polyethers such as glymes may be more suitable for providing a boron source from a storage and dispensing vessel of the type disclosed above herein. A solution in diglyme ($MeOCH_2CH_2OMe$) is also commericaly available but the binding of the borane is much weaker and allows a loading of only 0.5–1.0 wt %. Substituted THF derivatives and related polymers may usefully be employed to reduce the binding energy of the borane. Much higher borane storage densities in the storage and dispensing vessel may be obtainable using more strongly bound adducts such as $Me_2S.BH_3$ which as a 1:1 adduct with only 5% excess $SMe_2$ is ca. 12 M in borane. This adduct decomposes at 44° C. Solid and stable diborane carriers have been employed as reductants in the pharmaceutical industry. These Lewis bases include $Me_2SCH_2CH_2SMe_2$.

The B—F bond is remarkably stable, having one of the highest known dissociation energies of 646 kcal/mol. In boron hydrogen fluorides, the B—H bond energy is only 380 kJ/mol. The great strength of the B—F bond explains why $BF_3$ adducts with water, alcohols and primary and secondary amines are stable but that these ligands are readily hydrolyzed by $BCl_3$. Even ethers can be cleaved by $BCl_3$ to form RCl and $ROBCl_2$. $BH_2F$ can be prepared by a variety of routes. $BHF_2$ may be prepared by heating a 1:4 mixture of $B_2H_6$ and $BF_3$ at 100° C. or above using ether, methanol or $BCl_3$ as a catalyst. Alternatively, $NHF_2$ may be formed by reaction of $BF_3$ with $HBX_2$ (X=Cl, Br) or $B_2H_5X$ at room temperature, by heating $BF_3$ with $KBH_4$ at 110° C. or by reacting $HB(OMe)_2$ with excess $BF_3$. $BHF_2$ undergoes rapid H—F exchange with $BF_3$ and H—D exchange with $D_2D_6$, but $BHF_2$ slowly decomposes at room temperature. Pure $BHF_2$ at 0.67 atm partially disproportionates to $B_2H_6$ and $BF_3$ with an equilibrium constant of 0115 $atm^{-1}$ at 24° C. Heating the adduct $BHF_2.NH_3$ results in decomposition into $BF_3.NH_3$, which forms $[NH_4]BF_4$ at temperatures in excess of 140° C.

The boron source in the storage and dispensing vessel of the invention may also utilize suitable subfluorides. The subfluoride $B_2F_4$ ($T_m$=−56° C., $T_b$=−34° C.) may be prepared by cracking at 1850° C. over crystalline boron to form BF which is condensed at −196° C. and subsequently reacted with $BF_3$. Alternatively, reaction of $B_2O_2$ with $SF_4$ or else reaction of $B_2Cl_4$ with $SbF_3$ may be employed to yield $B_2F_4$. After formation of $B_2F_4$, subsequent addition of $BF_3$ yields $B_3F_5$ which is not thermally stable, decomposing above −50° C. to form $B_8F_{12}$. Reaction of $B_8F_{12}$ with various Lewis bases can be carried out to yield materials of the stoichiometry $L.B(BF_2)_3$. $B_2F_4$ decomposes at a rate of ca. 8% per day at room temperature and reacts rapidly with oxygen.

For a given Lewis base, the adduct stability usually increases as: $BF_3 < BCl_3 < BBr_3 < BI_3$ which may be attributable to loss of π-bonding as one goes from planar $BF_3$ to pyramidal $BI_3$.

In addition to the foregoing, a large number of tetrafluoroborates $M(BF_4)_n$ are commercially available.

Activated microporous carbon is usefully employed as an adsorbent in the general practice of the invention. It is hydrophobic and is especially suited for adsorption of organic substances, whereas zeolites, alumina and silica preferentially adsorb polar or polarizable material. A variety of narrow-pore and wide-pore activated carbons are produced from a number of different natural and synthetic sources. Natural sources such as coke, pitches and lignin-containing plant matter can be significant sources of inorganic matter measured as ash—primarily as silica and other metal oxides and sulfides. Synthetic sources such as methane, acetylene and various polymers leads to cleaner materials. Carbon must be heated to ca. 3000° C. to be converted to graphite. Carbon and various "blacks" (gas, lamp, furnace, etc.) typically are contaminated with oxygen and hydrogen, either from the carbon source or upon steam activation. Oxygen is present as carbonyl, carboxylate, phenol, lactone, quinoline and ether groups. Hydrogen is typically located at the edge of the carbon layers. Nitrogen is incorporated in the aromatic layer as heteroatoms. The oxygen functional groups typically have an acidic character; although, furnace and thermal blacks are produced in a reducing atmosphere and the 0.2–2.0 wt % oxygen is present as basic oxides on the surface. The pH of an aqueous slurry of the various carbons is an indication of the degree of oxidation. Furnace blacks have pH>7, the pH is 4–6 for gas blacks and the pH is 2–4 for oxidized carbon blacks. The surface oxides are destroyed at high temperatures, the loss of "volatiles" at 950° C. being an indication of the oxygen content. Modification of the surface properties can be carried out by a variety or organic reactions, such as alkylation, halogenation, esterification, silylation.

Activated carbon has a variety of porosities, typically including: macropores of greater than 50 nm, mesopores of 50–2 nm, and micropores of less than 2 nm. The large surface area of many activated carbons of 500–1500 cm$^2$/m is mainly due to the inner microporous structure. The micropore volume of activated carbon is ca. 025–0.4 cm$^3$/g. Carbon molecular sieves have very small micropore maximum at 0.2–0.3 nm. Activated coke has a maximum at 0.5–07 nm while activated carbon has a maximum at 0.8–1 nm pore size. This pore structure can be modified to a certain extent by repeated thermal treatment, e.g., controlled cracking of hydrocarbons in the micropores and partial gasification. In this way, micropore diameters between 0.3–0.9 nm can be attained. The pore size distribution in carbons is not as narrow as it is for zeolitic molecular sieves. (Zeolites typically have a bimodal distribution of pore sizes with one maximum of micropores at 0.2–0.3 nm and another of macropores at 300 nm). A pelletized activated carbon reportedly can hold up to 18 wt % of its mass as toluene. Surface fluorination of carbon appears to reduce the pore size and the adsorption capacity for water. Some fluorinated carbons are not highly stable.

For higher heats of adsorption and more strongly bound adsorbates, thermal-swing regeneration processes are usefully employed for desorption of the sorbed fluid on the sorbent material. Desorption by pressure-swing is often economical if the heat of adsorption is less than 30 kJ/mol adsorbate.

The solid phase adsorbents usefully employed in the broad practice of the present invention include such as carbon, silica, alumina and zeolites more closely, including chemical reactivity and particle geometry. While the discussion herein is directed primarily to boranes and boron source materials, it will be appreciated that the utility of the invention is not thus limited, but rather extends to a wide variety of other fluid and gas species which may be stored in and dispensed from storage and delivery vessels as described herein. Examples of such other species include stibine source compositions. Stibine may for example be generated in situ in a storage/dispensing vessel, e.g, by the provision of a resistively heated antimony wire with hydrogen flowing over it.

In the use of solid phase adsorbents for boron source storage and delivery, silica, alumina and zeolites may be employed in the storage and dispensing vessel as the sorbent media.

$BF_8$ and diborane react readily with silica, alumina, and silico-alumina zeolites to form a variety of monodentate —$OBX_2$ or —$OBH_2$ and bidentate —$O_2BX$ or —$O_2BH$ groups. These reactions occur with water of hydration, silanol SiOH and siloxane Si—O—Si groups for silicon, and with analogous groups for aluminum. The facility of these reactions, even with thoroughly dehydrated silicas and aluminas, indicates that these sorbents may be unsuitable materials for storage of highly reactive reagents such as the boron halides and hydrides. Zeolites, i.e., ionic silico-aluminates, will undergo the same deleterious reactions.

In respect of carbon sorbent materials, carbon thin films may be produced by inert atmosphere pyrolysis of thermosetting polymers such as polyvinylidene chloride, polyfurfuryl alcohol, cellulose, polyacrylonitrile, phenol formaldehyde and polyamides. Activated carbon fibers can be fluorinated at relatively low temperatures of ca. 200° C. such that C=C groups are converted to C—F. The greater the degree of fluorination the more hydrophobic the surface. This may be less preferred for $BF_3$ absorption, since $BF_3$ is hydrophilic not hydrophobic.

The surface properties of active carbons and carbon blacks are strongly influenced by the presence of surface oxides formed during the manufacturing process. Carbons having the same pore size distribution and surface area but different chemical characteristics often behave quite differently. Infrared spectroscopy, selective neutralization techniques, analysis of thermal decomposition products and reactions with other specific reagents may be employed to obtain information on the nature of the oxygen fragments.

Newer activated carbons have more uniform micropore size distributions and greater surface area than traditional activated carbons. Carbon materials have been reported to have surface areas in excess of 2500 m2/g and pore volumes of 2.0–2.6 cm$^3$/g with the average pore diameter of 23–25 Å.[5] These values are roughly twice the surface area and four times the micropore volume of average activated carbons, and are available in powder form and in granular form. Such carbon may be made by a direct chemical activation route wherein petroleum coke, or other carbonaceous sources, is reacted with excess KOH at 400–500° C. to form an intermediate product that is pyrolyzed to 800–900° C. The potassium salts are washed from the active carbon with water. Petroleum coke is preferred, yielding low ash contents of less than 3 wt %. The effective surface areas as measured by the BET method may be on the order of 3000–3400 m$^2$/g. This exceeds the theoretical area of 2600 g/cm$^2$ calculated for the area of one gram of graphitic planes due to multilayer adsorption and pore filling of the highly microporous structure. The volume for pores of less than 20 Å in such material is 1.3–1.7 cm3/g and the volume for pores greater than 20 Å is 0.7–0.9 cm$^3$/g. The bulk density of the carbon is 0.29–0.32g/cm$^3$. Swelling of the carbon may occur and under some conditions the carbon material can adsorb molecules larger than the pore sizes would appear to permit.

One of such high porosity carbons was used for adsorption of methane (22 wt % methane at 25° C. and 100 atm). Lowering the temperature to −30° C. increased the amount of methane stored on the sorbent by about a factor of two. The use of superadsorbent carbon significantly increases the storage density from 0.16 kg/L at 20 MPa for the high pressure gas to about 0.25 kg/L at 160 atm and −30° C. This compares with a density of 0.41 kg/L for the liquid at −160° C. The micropore volume of 0.5 L/kg indicates that half of the carbon volume was available for storage. Thus, for an advantage over compressed gas, the density of the adsorbed methane must be more than double that of the gas above it. To store the same amount of methane per volume over the activated carbon at 25° C., the pressure is reduced from 100 atmospheres of compressed gas to 40 atmospheres. At 40 atmospheres a compressed gas cylinder stores less than 40% of the amount of gas possible over an equilibrium volume carbon adsorbent bed.

Storage of $BF_3$ requires the use of fluorocarbon and chlorofluorocarbon gaskets, since other plastics tend to become brittle. Cylinders must be anhydrous and should not be made of cast iron which is easily attacked by "active" fluorides. This sorbent may be present in particle shapes of beads, pellets and granules, depending on the required surface area, bed void fraction, and mass transport and momentum characteristics required in a given application. The internal surface area of an adsorbent is often more important than the external surface area. By creating a particle shape where the middle of the particle is more accessible than is the case in a sphere or cylinder, a greater fraction of the micropores is accessible and the access time is reduced. Shapes such as those employed by the Trisiv sorbent (Union Carbide Corporation, Danbury, Conn.) have a high percentage of the internal sorptive volume close to the surface and may be employed to enhance mass transport and increase sorbate loading.

The intraparticle voids of a sorbent medium are generally independent of the shape of the particle whereas the interparticle voids are dependent upon (i) size of the particle, (ii) size distribution of the particles, (iii) shape the particles and (iv) ratio of the column diameter to the particle diameter. High void space occurs within 1 to 2 particle diameters from the wall of the column and channeling can occur if the bed is not packed efficiently. Such voids are problematic for purification technologies but may be advantageous for adsorption/desorption applications where vacant channels will facilitate diffusion of the gas into and out of the adsorbent bed. Pressure drop is likewise an important sorbent bed parameter and the effect of particle shape can be quantified using a quantity called a shape factor. Beads have a value of 1.00, pellets 0.85, Trisiv has a value of 0.63 and granules from 0.45–0.65. The larger the shape factor the lower the pressure drop. Since Trisiv has a moderately low shape factor, channels in the packing bed may relieve some of the higher pressure drop which equates to a slower response time for a pressure swing cycle.

In terms of alternative borane source materials, $B_5H_9$ or $B_{10}H_{14}$ are potentially usefully employed in the practice of the invention. Pentaborane has a very favorable vapor pressure at room temperature. Decaborane requires significantly higher operating temperatures for transport. Decaborane is fairly air stable. Pentaborane is moderately water stable but explosive with oxygen.

Organic adducts, such as L—$BH_3$, L—$BH_3$, may be employed in storage and delivery systems according to the invention. Adducts have been prepared from very strong to very weak bases. Care must be taken with regard to the Lewis acidity and reduction potential for $BX_3$ and $BH_3$ with respect to long term stability. Potentially useful Lewis bases include oxygen, nitrogen, sulfur and cyano groups.

Borohydrides and tetrafluoroborates, such as $M(BH_4)n$, $M(BF_4)n$, and $[ArN_2][BF_4]$ pose some interesting possibilities, and may be employed with "thermal swing" processes or "pressure swing" desorption.

Polymeric organic adsorbents may be employed as the sorbent medium in the broad practice of the invention. Most organic polymers are not available in highly porous forms and must be reprocessed or used as a coating on a underlying substrate, thus reducing the capacity. Simpler polymers are preferred, including, for example, polyacrylonitrile, polystyrene, polybutadiene, etc. Highly absorbent polymers generally are not appropriate for gas storage.

In the storage and dispensing of boron source materials, reversible adducts may be formed to "anchor" the composition for storage, and to subsequently readily release the boron source or a precursor thereof.

Polymeric adsorbents with Lewis base functionality may be useful for storage of $BF_3$, $B_2H_6$ and $SbH_3$. A wide variety of electron-donating molecules such as Group 15 and 16 heteroatoms and aromatic species interact with these gases. In order to design an efficient adsorption substrate, the adduct complexation must be strong enough to induce "condensation" of the gas at temperatures above the boiling point. In addition, the interaction must still be weak enough so that the gas can be desorbed when desired under mild conditions of pressure and/or temperature differential. An overview of the chemistry of molecular adduct formation is informative as a prelude to designing an effective solid-state supported adsorbent material.

There are many literature reports examining the reversible formation of adducts of $BF_3$ and Lewis bases which, along with related chemistry, have been the subject of reviews. Often times the objective of this work has been to effect $^{10}B:^{11}B$ isotopic separation due to the stronger $^{11}BF_3$—L bond strength as compared to $^{10}BF_3$—L. By using a special apparatus, magnification of the small difference in B—L dissociation energies results in amplification of the $^{10}B:^{11}B$ isotope effect, thus yielding enriched material.

Many ether and amine donors form stable and isolable complexes with $BF_3$ which are bound so tightly that dissociation is very difficult. As examples, $BF_3.OME_2$ can be distilled intact at atmospheric pressure, $BF_3.NMe_3$ sublimes intact at 82° C./3 torr and $BF_3$ pyridine is only 18% dissociated in the gas phase at 300° C. It has been shown that the presence of sterically bulky groups adjacent to the heteroatom leads to significant reduction in the bond strength of the adduct, as measured by the heat of reaction. Anisole (MeOPh) and 2,6-dimethylpyridine both form weak adducts with $BF_3$ that cannot be isolated at room temperature. By way of example, the heat of formation of $BF_3 \cdot MeOPh$ is $-12.1$ kcal/mol and the vapor pressure at 40° C. is about 1800 torr. (anisole decomposition may be on the order of 5% decomposition of the anisole after contact with $BF_3$ for 30 days.) The heat of formation of $BF_3$. pyridine is $-25$ kcal/mol while the heat of formation for $BF_3.2,6$-dimethylpyridine is $-17.5$ kcal/mol and for $BF_3.2$-t-butylpyridine is only $-14.8$ kcal/mol. The 2,6-dimethylpyridine adduct is reportedly appreciably dissociated above 150° C. The much more congested $NMe_2$ $(2,6\text{-}Me_2C_6H_3).BF_3$ reportedly has a dissociation pressure of 10 torr at 0° C.

A variety of aromatic nitrile adducts with $BF_3$ was examined, demonstrating the importance of electronic, inductive effects as well to adduct destabilization. Pure $BF_3$ displays a vapor pressure of 300 torr at $-112°$ C. ($T_b=-101°$ C.) while the $4\text{-}MeC_6H_4CN\text{---}BF_3$ adduct has a vapor pressure of only 4 torr at 50° C. Moving the methyl group on the aromatic ring one carbon, from the para to meta position, in $3\text{-}MeC_6H_4CN\text{---}BF_3$ yields the much higher dissociation vapor pressure of 82 torr at 50° C., a 20-fold pressure increase.

Other ligand systems that form stable adducts with $BF_3$ include ketones, esters, and amides. Of the ketone complexes, $PhC(O)CH_2Cl$ and fluorenone showed the weakest bonding. Ester and amide cleavage does not seem to be especially facile. Less commonly used donor ligands such as sulfoxides $R_2SO$, amine N-oxides $R_3N\text{---}O$, phosphine oxides, etc. may be employed. Aromatic rings, such as in anthracene, form unstable adducts which may be utilized to form charge transfer complexes upon UV radiation. While aromatic polymers may be favorable adsorbents, $BF_8$ can potentially cause further cross-linking. Aldehydes are polymerized by $BF_3$.

Care must be taken in choosing the appropriate ligand or functional group to form a $BF_3$ adduct since $BF_3$ is a very strong Lewis acid that can undergo a number of reactions. Many Group 13 trihalides are well-known Friedel-Craft alkylation catalysts as well as being able to catalyze various polymerization and rearrangement/isomerization reactions. In addition, even though there is only a single long pair available, certain bases appear to bind two equivalents of $BF_3$. The properties of an adduct such as $NEt_3.2BF_3$ are more consistent with the covalent interaction in $Et_3NBF_2$ $(\mu\text{-F})BF_3$ than in the ionized $[NEt_3BF_2]+[BF_4]$-form. Pyridine may be employed to form a similar adduct.

In respect of adducts of $BF_3$, complexation with fluoride ion may be utilized. Reaction with metal fluorides $MF_x$ or organic fluorides RF may be conducted to yield a number of tetrafluoroborate $BF_4$-type complexes. As with the adducts with neutral donors, thermal decomposition of these complexes can also yield $BF_3$, leaving an involatile material behind. Reactions that release $BF_3$ at reasonable temperatures include thermolysis of $CaF_2.(BF_3)_x$ upon heating to 200–350° C., and thermolysis of the diazenido complex $[PhNN]BF_4$.

A large number of interactions are observable between $BF_3$ and a variety of Lewis bases. As mentioned, inorganic solids such as alumina, silica, zeolites and activated carbon are useful adsorbent materials. Surface hydroxyls MOH as well as M—O—M bridging oxo groups undergo reaction with $BF_3$ to form surface $MOBF_2$ and MF groups in magnesia, silica, alumina and zeolites. When zeolites are used, dealuminization of the surface of zeolites with boron filling the vacancy may occur. The adsorption of $BF_3$ on activated carbons may also be utilized in boron trifluoride storage and dispensing in the broad practice of the present invention.

Many polymeric materials may also serve as adsorbents in the practice of the invention, depending on the specific functional groups, capacity, cost, melting/glass transition points, porosity, surface area, susceptibility to decomposition, etc. The functional groups that interact with the species to be adsorbed are appropriately selected to minimize the chance of adverse interactions. Therefore due to the reactive nature of boron halides and hydrides, hydroxy OH, primary or secondary amino $NH_2/NHR$, and halide X=Cl, Br, I functionalities are desirably avoided. The same is true of protic functional groups that may result in hydrolysis and halides that may result in halide exchange. Furthermore, unsaturated groups are desirably avoided in the polymer adsorbent for hydride species such as $BH_3$ or $SbH_3$. These reagents can reduce olefin, acetylene, nitrile, aromatic, nitro and carbonyl groups, sometimes very exothermically. Preferred groups are ether and amine ($NR_2$) groups for the hydrides, and aromatic, nitrile CN, nitro $NO_2$ and carbonyl CO groups for $BF_3$. The properties of the polymer are selected to permit its ready handling. High glass transition temperatures Tg, and melting points $T_m$ are desired to keep the adsorbent in the solid state and to prevent solid flow/creep and sintering. Higher molecular weight polymers typically have high melting points.

If used as a coating on another substrate, high cost polymeric materials can be used as the sorbent medium in the broad practice of the present invention. Polymers containing more than one type of active functionality, either in polyfunctional monomers or due to copolymers or graft polymers containing two or more different monomeric units, may be usefully employed.

The sorbents usefully employed in the present invention generally contain minimum contaminants and the sorbent may be initially thermally pretreated in vacuum to remove any volatile residues, if necessary or desirable. Some polymers contain UV stabilizers, especially BHT (butylated hydroxytoluene) in ppt quantities which can be difficult to remove. The potential for the presence of nonvolatile reactive species may require pretreatment of the adsorbent with the gas to be adsorbed, in order to prevent deleterious trace reactions in the storage and dispensing vessel in subsequent use. The preferred form for the adsorbent is the shape and conformation providing the highest possible effective surface area. Larger particles with multiple accessible channels are generally easier to handle and load.

Potentially suitable commercially available polymers are set out in Table I below. The polymers may be directly usable as an adsorbent if in an appropriate form, or they may be used to coat another substrate. As a coating, the polymer can either be dissolved and mixed with the solid substrate or else the appropriate monomer can be polymerized on the desired substrate.

TABLE I

Summary of potentially useful polymers

| Name | Formula | $T_g$ (° C.) | $T_m$ (° C.) | Cost ($/g) | Funcitonality | Form |
|---|---|---|---|---|---|---|
| Poly(acryonitrile) | —CH$_2$CH(CN)— | 85 | 317 | 1.00 | CN | powder |
| Poly[1,4-benzenedicarbonyl-alt-bis(4-phenoxyphenyhl)methanone] | —C$_6$H$_5$OC$_6$H$_5$C(O)— | 170 | 381 | 0.35 | O, Ar | — |
| Poly(butadiene) | —CH$_2$CH=CHCH$_2$— | −102 | | 0.30 | C=C | slab |
| Poly(t-butylstyrene) | —CH$_2$(CH)C$_6$H$_4$-t-Bu)— | — | — | 1.35 | Ar | — |
| Poly(caprolactone) | —(OCH$_2$)$_5$C(O)— | −60 | >60 | 0.1 | CO | pellets |
| Poly(coumarone-co-indene) | Coumarone/indene | — | — | 0.01 | Ar, OR | — |
| Poly(diallyl isophthalate) | —C$_3$O$_2$CC$_6$H$_4$CO$_2$C$_3$— | — | — | 0.25 | CO$_2$, Ar | — |
| Poly(diallyl phthalate) | | — | — | 0.6 | Co$_2$, Ar | — |
| Poly(ethylene oxide) | —CH$_2$CH$_2$O— | −67 | 65 | 1.80 | OR | powder |
| Poly(ethylene succinate) | —OCH$_2$—CH$_2$O$_2$—CH$_2$CH$_2$CO— | −1 | 108 | 1.10 | CO$_2$, OR | chunks |
| Poly(ethylene terephthalate) | —CH$_2$CH$_2$O$_2$CO$_6$H$_4$-4-CO— | 81 | — | 0.15 | CO$_2$, OR | pellets |
| Poly(ethylene-co-vinylacetate-co-carbon monoxide | | −32 | — | — | — | — |
| Poly(oxomethylene) | —CH$_2$)— | −30 | 182 | 0.10 | OR | beads |
| Poly(perfluoropropylene oxide-co-perfluoroformaldehyde) | —CF(CF$_3$)CF$_2$O]$_k$—[CF$_2$O]$_y$— | — | — | 1.60 | OR | — |
| Poly(1,4-phenylene ether-ether-sulfone | —C$_6$H$_4$—SO$_2$C$_6$H$_4$-4-OC$_6$H$_4$-4-O— | 192 | — | 0.03 | OAr, SO$_2$ | powder |
| Poly(1,4-phenylene sulfide) | —C$_6$H$_4$-4-S | 150 | 285 | 1.00 | SAr | pellets |
| Poly(phenylsulfone) | —C$_6$H$_4$-4-SO$_2$C$_6$H$_4$-4-OC$_6$H$_4$ | 208 | — | 1.25 | OAr, SO$_2$ | — |
| Poly(styrene) | —CH$_2$(CHPh)— | 95 | — | 0.01 | Ar | — |
| Poly(styrene-co-divinylbenzene) | (CH$_2$CHC$_6$H$_4$CH$_2$CH)$_x$—(CH$_2$CHOh)$_x$ | — | — | 0.20 | Ar | macroporous spheres |
| Poly(sulfone) | | — | — — | | Ar, SO$_2$ | — |
| Poly(vinyl acetate) | —CH(O$_2$CMe)—CH$_2$ | 30 | — | 0.07 | CO$_2$ | beads |
| Poly(9-vinylcarbazole) | —CH(C$_6$H$_4$NC$_6$H$_4$)CH$_2$— | 200 | — | 3.50 | NR | powder |
| Poly(vinylformal) | —CH$_2$(C$_4$?O$_2$H$_6$)— | 108 | — | 0.28 | OR | powder |
| Poly(vinylmethylketone) | —CH(C(O)Me)CH$_2$— | 28 | — | 9.0 | C=O | chips |
| Poly(vinylphenylketone) | —CH(C(O)Ph)CH$_2$— | 58 | — | 0.01 | C=O, Ar | pellets |
| Poly(4-vinylpyridine) | —CH(C$_5$NH$_4$)CH$_2$ | — | — | 0.75 | NR | powder |
| Poly(2-vinylpyridine-co-styrene) | —CH(C$_5$NH$_4$)CH$_2$—CH(Ph)CH$_2$ | — | — | 2.00 | NR, Ar | granular |
| Poly(vinylpyrrolidone) | —CH(NC$_4$H$_6$O)CH$_2$— | — | >300 | 0.05 | NC=O | powder |
| Poly(vinyltoluene) | —CH(C$_6$H$_4$Me)CH$_2$— | — | — | 1.40 | Ar | granular |

While the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. A system for the storage and delivery of B$_2$H$_6$, comprising a storage and dispensing vessel containing a sorbent material having sorptive affinity for B$_2$H$_6$ and effective when B$_2$H$_6$ is contacted with the sorbent to convert B$_2$H$_6$ to a sorbed .BH$_3$ form which is desorbable by pressure mediated desorption and/or thermally-mediated desorption to release B$_2$H$_6$ from the B$_2$H$_6$ from the vessel, and further comprising sorbed .BH$_3$ on the sorbent material.

2. A system according to claim 1, wherein the means for selectively discharging desorbed B$_2$H$_6$ from the vessel, comprise a valve head assembly including a valve which is selectively openable or closeable, to effect discharge or termination of flow of B$_2$H$_6$ from the vessel, respectively.

3. A system according to claim 1, wherein the sorbent material comprises a sorbent material whose surface is functionalized with Lewis base functional groups.

4. A system according to claim 1, wherein the sorbent material is functionalized with .NR$_2$ groups, wherein each R is independently selected from the group consisting of hydrogen and sterically acceptable hydrocarbyl groups.

5. A system according to claim 4, wherein each R is independently selected from the group consisting of H, C$_{1-8}$, alkyl, C$_{7-14}$ alkaryl, and C$_{7-14}$ aralkyl.

6. A system according to claim 3, wherein the Lewis base functional group is .N(CH$_3$)$_3$.

7. A system according to claim 1, wherein the sorbent is selected from the group consisting of silica, alumina, aluminosilicates, kieselguhr, carbon, and polymers.

8. A system according to claim 1, wherein the sorbent is activated carbon.

9. A system for the storage and delivery of a sorbable fluid, comprising a storage and dispensing vessel containing a sorbent material having sorptive affinity for the sorbable fluid, and from which the fluid is desorbable by pressure-mediated and/or thermally-mediated desorption, wherein the surface of the sorbent material is functionally enhanced by a reagent which alters the binding energy of the fluid to the sorbent by providing surface functionalities with which the sorbable fluid interacts to form surface complexes from which the fluid is desorbable by said pressure-mediated and/or thermally-mediated desorption, and further comprising in said storage and dispensing vessel surface complexes of said sorbable fluid on said sorbent material.

10. A system according to claim 9, further comprising means for selectively discharging desorbed fluid from the vessel.

11. A system according to claim 9, wherein the sorbent material is functionalized by contact with the reagent with functional groups which coordinate to the sorbable fluid.

12. A system according to claim 9, wherein the sorbent material is functionalized by reaction of the sorbent material with a reagent which decreases the binding energy of the sorbent to the fluid.

13. A system according to claim 9, wherein the reagent is a Lewis base.

14. A system according to claim 13, wherein the Lewis base is selected from the group consisting of ammonia, amines, quaternary ammonium compounds, nitrites, ethers, polyoxy hydrocarbyl compounds, oxygen, nitrogen, sulfur and cyano compounds.

15. A system according to claim 9, wherein the sorbable fluid is selected from the group consisting of arsine, phosphine, boron hydrides, and boron halides.

16. A system according to claim 9, wherein the sorbable fluid comprises a boron-containing gas, and the surface complexes comprise a borane adduct.

17. A method of storing and selectively dispensing $B_2H_6$, comprising providing a vessel containing a sorbent surface having Lewis base functional groups thereon, and introducing $B_2H_6$ to the vessel so that the sorbent surface effects the reaction:

$$B_2H_6 + \text{—}NR_2 \rightarrow BH_3.NR_3$$

wherein R is hydrogen or a sterically acceptable hydrocarbyl group, and desorbing $BH_3$ from the sorbent surface to form $B_2H_6$ for discharge from the vessel.

18. A method according to claim 17, wherein the sorbent surface having Lewis base functional groups thereon is formed by amination of the sorbent surface.

19. A method according to claim 18, wherein the amination is carried out by contacting the sorbent surface with an aminating agent selected from the group consisting of ammonia, quaternary ammonium compounds, polyvinylamine, nitrile compounds and nitrile polymers.

* * * * *

UNITED STATES PATENT AND TRADEMARK OFFICE
CERTIFICATE OF CORRECTION

PATENT NO. : 5,993,766

DATED : November 30, 1999

INVENTOR(S) : Glenn M. Tom and James V. McManus

It is certified that error appears in the above-identified patent and that said Letters Patent is hereby corrected as shown below:

| | |
|---|---|
| Column 8, line 58: | change "des-orption" to --de-sorption--. |
| Column 9, line 58: | line runs into next column. |
| Column 9, line 64: | change "|BH$_2$(NH$_3$)$_2$|BH$_4$" to --[BH$_2$(NH$_3$)$_2$]BH$_4$--. |
| Column 10, line 18: | change "M" to --$\underline{M}$--. |
| Column 10, line 41: | change "M" to --$\underline{M}$--. |
| Column 10, line 64: | change "|NH$_4$|BF$_4$" to --[NH$_4$]BF$_4$--. |
| Column 14, line 24: | change "|ArN$_2$| |BF$_4$|" to --[ArN$_2$][BF$_4$]--. |
| Column 15, line 1: | change "C/.3" to --C/3--. |
| Column 15, line 55: | change "|NEt$_3$BF$_2$| + |BF$_4$|" to --[NEt$_3$BF$_2$] + [BF$_4$]--. |
| Column 15, line 67: | change "|PhNN|BF$_4$" to --[PhNN]BF$_4$--. |
| Column 17, table 1: | after "Poly(styrene)" row, a row has been left out. Insert: --Poly(styrene-*co*-acrylonitrile) | -CH$_2$(CHPh)-CH$_2$CH(CN)- | ? | ? | 0.30 | Ar, CN | pellets |--. |
| Column 17, table 1: | 11 lines down, change "OCH$_2$-CH$_2$O$_2$" to --OCH$_2$CH$_2$O$_2$--. |
| Column 17, table 1: | 16 lines down, change "|CF$_2$O|$_y$" to --[CF$_2$O]$_y$--and change "CF$_2$O|$_x$" to --CF$_2$O]$_x$--. |

Signed and Sealed this

Tenth Day of April, 2001

NICHOLAS P. GODICI

Attest:

Attesting Officer

Acting Director of the United States Patent and Trademark Office